(12) United States Patent
Hohmann et al.

(10) Patent No.: US 6,928,780 B1
(45) Date of Patent: Aug. 16, 2005

(54) METAL FOIL/SCRIM FLASHINGS

(75) Inventors: Ronald P. Hohmann, Hauppauge, NY (US); Ronald P Hohmann, Jr., Hauppauge, NY (US)

(73) Assignee: Hohmann & Barnard, Inc., Hauppauge, NY (US)

( * ) Notice: Subject to any disclaimer, the term of this patent is extended or adjusted under 35 U.S.C. 154(b) by 264 days.

(21) Appl. No.: 10/427,050

(22) Filed: Apr. 30, 2003

Related U.S. Application Data

(63) Continuation-in-part of application No. 10/143,484, filed on May 10, 2002, now Pat. No. 6,584,746.

(51) Int. Cl.$^7$ ................................................ E04C 1/40
(52) U.S. Cl. ................................ 52/513; 52/61; 52/62; 52/383; 52/302.6; 428/295.1; 428/297.1; 428/297.4
(58) Field of Search .............................. 52/513, 61, 62, 52/383, 302.1, 302.6; 428/295.1, 297.1, 297.4; 156/40

(56) References Cited

U.S. PATENT DOCUMENTS

| | | | | |
|---|---|---|---|---|
| 3,728,195 A | * | 4/1973 | Bolles ......................... | 156/441 |
| 4,239,795 A | * | 12/1980 | Haage et al. ............... | 428/247 |
| 4,295,911 A | * | 10/1981 | Haage et al. ............... | 156/315 |
| 4,396,665 A | * | 8/1983 | Rowe ......................... | 428/148 |
| 4,686,803 A | * | 8/1987 | Couderc et al. ............. | 52/97 |
| 4,755,409 A | * | 7/1988 | Harkness .................... | 428/40 |
| 4,762,744 A | * | 8/1988 | Woiceshyn et al. ......... | 428/219 |
| 4,775,567 A | * | 10/1988 | Harkness ................... | 428/40.3 |
| 4,910,931 A | * | 3/1990 | Pardue, Jr. .................. | 52/169 |
| 5,634,310 A | * | 6/1997 | Hohmann ..................... | 52/513 |
| 5,860,259 A | * | 1/1999 | Laska ......................... | 52/302.3 |
| 5,870,864 A | * | 2/1999 | Snyder et al. ............. | 52/169.5 |
| 6,035,582 A | * | 3/2000 | Pacific ......................... | 52/58 |
| RE36,676 E | * | 5/2000 | Sourlis ....................... | 52/169.5 |
| 6,167,660 B1 | * | 1/2001 | Sama ............................ | 52/58 |
| 6,224,700 B1 | * | 5/2001 | Oakley ......................... | 156/71 |

OTHER PUBLICATIONS

Dur–O–Wal, Inc., Product Catalog (Aurora, Il; 2000).
Wire Bond Corp.; Product Catalog (Charlotte, NC; 2002/2003).
Hohmann & Barnard, Inc.; Product Catalog (Hauppauge, NY; 2002).
Hyload, Inc.; Product Catalog (Wadsworth, OH; 1996).
York Mfg, Inc.; Product Catalog (Sanford, ME; undated).
Advanced Bldg Products, Inc. (Springdale, ME; undated).
Sandell Mfg. Co., Inc. (Schenectady, NY; undated).

* cited by examiner

*Primary Examiner*—Carl D. Friedman
*Assistant Examiner*—Nahid Amiri
(74) *Attorney, Agent, or Firm*—Siegmar Silber

(57) ABSTRACT

A metal foil/scrim flashing laminate is disclosed, which laminate is for flashing cavity walls. The laminate has at least one layer of a modified polymeric coating which is disposed by roll coating onto the central metal foil. In all the embodiments, the metal foil lamina is sandwiched between either layers of the modified polymeric coating or between a coating layer and a hot melt adhesive layer. In application the laminates are used with a release paper to form a peel-and-stick product and is suitable for surface mounting. An embodiment of the metal foil/scrim flashing with adhesive is shown for field installation with sealants and mystics.

20 Claims, 5 Drawing Sheets

METAL FOIL/SCRIM FLASHINGS

RELATED APPLICATION

This application is a continuation-in-part of a recently filed patent application entitled Metal Foil Masonry Flashings and Termination Bar Therefor which, in turn, is a continuation-in-part of an application entitled Masonry Flashing System bearing Ser. No. 10/143,484 and filed May 10, 2002 now U.S. Pat. No. 6,584,746.

BACKGROUND OF THE INVENTION

1. Field of the Invention

This invention relates to an improved flashing system for cavity wall structures, and more specifically to metal foil/scrim Flashings suitable for through-wall and surface mounting installations.

2. Description of the Prior Art

In the past, investigations relating to cavity wall flashing systems for brick veneer masonry construction have been conducted. While strides have been made in flashing-related technologies, including metal foils, elastomeric materials and hot melt adhesives, there still remain several areas where continued development is ongoing.

The inventors' patents and their assignee's product line are all related to accessories for cavity wall structures and include insulation, anchoring and seismic devices, and masonry Flashings and are sold under the trademarks of Seismiclip®, Byna-Tie®, and DW-10-X®. These products, which are manufactured by Hohmann & Barnard, Inc., Hauppauge, NY 11788, have become widely accepted in the industry and have provided the inventors with particular insight into the technological needs of this marketplace.

Masonry walls with brick veneer are designed with an inner and an outer wythe and a cavity therebetween. The brick veneer outer wythe provides an aesthetic finish to the building, and the masonry block inner wythe and insulation thereon isolates the interior of the building from the environment. The walls of a building are constructed to exclude water and water vapor from the interior. Since the presence of excessive levels of water or water vapor in the cavity hastens the deterioration of building materials, various masonry flashing systems have been proposed.

Because of widespread usage and familiarity with bituminous and asphaltic products in roofing applications, when masonry flashing systems were first designed, the building construction industry adopted the familiar copper and asphalt products. At that time the technology of pressure-sensitive hot melt adhesives needed for peel-and-stick applications was insufficiently developed. Some critics indicated that the adhesive quality was insufficient for the rough masonry block surfaces. Because of the presence of plasticizers, others were apprehensive about the available hot melt adhesives meeting the requisite fire retardancy standards. Also, to provide fire retardancy, some pressure-sensitive products were marketed for building construction use with inorganic fillers, such as alumina trihydrate, antimony oxide or calcium carbonate. However, these filled pressure-sensitive products had disadvantages, such as application problems, phase separation, toxicity, and reduced adhesion upon activation.

Prefabricated peel-and-stick flashing materials have been proposed, such as those shown in Harkness, U.S. Pat. No. 4,775,567 (see infra). These materials have included layers of bitumen and of bituminous compounds for adhering the materials to the exteriors of masonry walls. While, under ideal circumstances, these peel-and-stick materials were easy to apply, the patent literature indicates that these materials did not conform well to irregular surfaces. Thus, the prior art bitumens used to secure these flashing materials to masonry walls often lacked the tackiness to bond tightly and durably to the wall surfaces. On occasion, when circumstances were not ideal, the bituminous materials drooled marring the aesthetics of the brick veneer.

Scrim material has long been used as a reinforcement for bitumen-coated Flashings. The scrims developed in the past have been of polyester or fiberglass and structurally arranged as matted, nonwoven sheets or as open-weave fabrics. Such scrims are embedded in resinous or bituminous layers to reinforce the metal or elastomeric lamina of the flashing. The nonwoven scrims are described in U.S. Pat. No. 3,728,195 to Bolles and later in U.S. Pat. No. 4,762,744 to Woiceshyn et al. . Descriptions of various open-weave fabric scrims are found in the product literature of CCX, Inc., Walterboro, North Carolina 29488.

In the past, the previously mentioned assignee hereof has distributed, under the Copper Aqua Flash membrane name, a line of composite flexible Flashings. The composite, in one form thereof, is 50 mil. thick and consists of a 3-ounce, solid sheet of annealed copper laminated on one side to a polyester film and bonded on the other with a highly adhesive SBS modified bitumen (rubberized asphalt) with a peel-and-stick silicone top sheet. By completely encapsulating the copper in the polyester film on one side and rubberized asphalt on the other, the copper is protected from corrosion by alkaline or acidic solutions. Although the rubberized asphalt virtually eliminated the possibility of non-adhered areas, the Copper Aqua Flash membrane still had some of the previously described disadvantages of a bitumen-based flashing system.

Despite these early efforts, developing the right combination of materials and methods for flashing cavity walls in a fast and efficient manner has proved elusive. In addition to the above described technical problems, because there is frequently a delay in erecting the inner wythe and the outer wythe, the flashing installed in the inner wythe is often exposed to substantial ultra-violet radiation. Thus, standards similar to ASTM Specification G154 for nonmetallic materials need to be met by masonry flashing systems.

In preparing for this application the following patents came to the attention of the inventors and are believed to be relevant to the further discussion of the prior art:

| U.S. Pat. No. | Inventor | Issue Date |
| --- | --- | --- |
| 6,224,700 | Oakley | May 1, 2001 |
| 6,035,582 | Pacific | Mar. 14, 2000 |
| 5,870,864 | Snyder | Feb. 16, 1999 |
| 5,860,259 | Laska | Jan. 19, 1999 |
| 4,910,931 | Pardue | Mar. 27, 1990 |
| 4,775,567 | Harkness | Oct. 4, 1988 |
| 4,762,744 | Woiceshyn et al. | Aug. 9, 1988 |
| 4,755,409 | Harkness | Jul. 5, 1988 |
| 4,396,665 | Rowe | Aug. 2, 1983 |
| 4,295,911 | Haage et al. | Oct. 20, 1981 |
| 4,239,795 | Haage et al. | Dec. 16, 1980 |
| 3,728,195 | Bolles | Apr. 15, 1973 |

Oakley—U.S. Pat. No. 6,224,700—issued May 1, 2001

Oakley in U.S. Pat. No. 6,224,700 (assigned to Mar-Flex Systems, Inc., Middletown, Ohio) describes a method of applying a composite material to an above-grade building component to form a tacky non-swelling elastomeric membrane. Thereafter, a flexible, non-porous polymeric sheet is pressed onto the tacky exterior of the elastomeric membrane. The polymeric sheet is stronger than the elastomeric membrane and protects the elastomeric membrane from punctures or tears. Here, in situ construction is both labor intensive and requires special equipment for installation.

Pacific—U.S. Pat. No. 6,035.582—issued Mar. 14, 2000

Pacific describes a flashing material which includes a sheet layer of copper, aluminum or other metal or a thin sheet of unreinforced plastic. Here it appears that in situ adhesives are applied.

U.S. Pat. No. 5,870,864—Snyder—Issued Feb. 16, 1999

Snyder describes a drainage system employing water collection pans which for insertion into the interior cavities of masonry block units over the length of a selected block wall course for collecting the water drained through the interior cavities of the upper courses and directing water to the exterior of the wall.

U.S. Pat. No. 5,860,259—Laska—issued Jan. 19, 1999

Laska describes an insulated drainage panel for use in cavity wall or veneer wall construction which panel includes a planar insulating board with a porous structure thereof.

U.S. Pat. No. 4.910.931—Pardue—issued Mar. 27, 1990

In the Pardue patent, a water collection and drainage system is described for a masonry block wall having bond beam block courses and intervening standard block courses. A system of upper water collection pans is supported along each upper bond beam course. Downspouts leading from drain openings in the upper collection pans drain collected from the pans through the vertical block cavities in lower block courses to the next lower series of collection pans. Weeping spouts lead laterally from the base collection pans to the exterior of the wall to continuously drain collected water from the interior wall cavities.

U.S. Pat. Nos. 4,775,567 and 4,755,409—Harkness—issued Oct. 4, 1988 and Jul. 5, 1988, respectively.

A waterproofing laminate suitable for use in roofs, floors or other surfaces where waterproofing is desired contains a reinforcing sheet, first and second bitumen layers secured to opposite surfaces of the reinforcing sheet, first and second compound bitumen layers secured to the bitumen layers, an elastomeric sheet secured to the first compound bitumen layer and a release sheet secured to the second compound bitumen layer. Certain preferred materials for use in the laminate are recited.

U.S. Pat. No. 4,762,744—Woiceshyn et al. issued Aug. 9, 1988

A reinforcing composite for bitumen-installed roofing membranes is described. Here resinous adhesive impregnates the filament of the scrim without filling in the spaces therebetween so as to maintain the porosity of the scrim. Then, upon installation, the bituminous material mechanically fastens the treated mat-like scrim to the roof.

U.S. Pat. No. 4,396.665—Rowe—issued Aug. 2, 1983

This patent, assigned to W. R. Grace & Co., describes a pre-formed, pressure-sensitive, bituminous-type waterproofing membrane. Here, a scrim is an open-weave reinforcement material in the adhesive layer which is formed from a mixture of bituminous material and a synthetic rubber polymer.

U.S. Pat. Nos. 4,295,911 and 4,239,795—Haage et al.—Oct. 20, 1981 and Dec. 16, 1980, respectively.

A protective covering for the protection of surface seals against mechanical damage in building constructions and other civil engineering constructions which comprises a composite of an elastic, waterproof thermoplastic synthetic resin film sheet and/or synthetic resin layer and a lattice-like fabric having knot couplings or points of intersection of the threads that yield under the effect of a load.

U.S. Pat. 3,728,195—Bolles—issued Apr. 15, 1973

This patent describes the preparation of nonwoven fiberglass and of nonwoven polyester scrims. Additionally the scrims include machine-direction, continuous fiberglass filament reinforcement across the entire width. The scrims are in the 0.1 to 5 ounces per square yard (4 to 200 grams per square meter) range.

For through-wall installation, the masonry flashing of this invention includes a metal foil/scrim membrane with a resinous or adhesive coating thereabout. For through-wall and surface mounted installations, the masonry flashing includes, the metal foil/scrim, as just described, but having on one surface thereof a pressure-activated hot melt adhesive and a release sheet. These membranes are designed to function cooperatively with drip plates and other accessories for brick veneer facing, and have been found to obviate the difficulties discussed while providing other advantages as set forth hereinbelow.

SUMMARY

In general terms, the masonry flashing system disclosed hereby includes a laminate for flashing. The laminated flashing is particularly applicable to cavity walls such as a wall with an inner wythe of masonry block and an outer wythe or veneer of brick. The masonry flashing laminate also includes a hot melt adhesive which encapsulates a metal foil layer and/or coats a surface of the laminate. In some embodiments, the adhesive is selected for compatibility with a peel-and-stick installation. When, for instance, during surface mounting, the laminate with hot melt adhesive thereon is pressed against the rough surface of the masonry block, the pressure activation creates a durable bond. The elastomeric portion of the laminate is constructed on a polymeric substate which in large part is a mixture of polyvinyl chloride and ethylene acetate carbon monoxide terpolymer. For purposes of improving puncture and tear resistance, a fibrous mat—either woven or non-woven—is embedded under a second elastomeric layer or cover.

Other components of the system include a stainless steel drip plate with a hot melt adhesive coating and a termination bar. The drip plate adhesive coating enables the installer to accurately position the plate and, during construction, maintain the alignment thereof. Optionally, a foam layer is placed on the lower surface of the drip plate and on the termination bar so as to improve the sealing of the installation.

The peel-and-stick technology shown herein enables quick and sure flashing of cavity walls which was unavailable prior to the advances in the materials of both elastomeric membranes and hot melt adhesives. The detailed description of these materials is provided hereinbelow. Preparing surfaces with adhesives and foams enables installation without additional caulking compounds and sealants.

OBJECTS AND FEATURES OF THE INVENTION

It is an object of the present invention to provide, for cavity wall construction, a metal-foil-containing masonry flashing system.

It is a further object of the present invention to laminate at least on the exterior surface of the metal foil a polymeric membrane and to coat the flashing with hot melt adhesive which, upon pressure activation, strongly adheres to the rough and porous surfaces of masonry block and brick.

It is another object of the present invention to provide in a masonry flashing system for cavity wall construction, combining metal foil and polymeric membrane technologies in system free of bituminous or asphaltic coatings, which flashing resists tearing and puncturing.

It is yet another object of the present invention to provide labor-saving metal foil masonry flashing system which utilizes peel-and-stick components that are easy and economical to install in cavity wall constructs having a masonry block inner wythe and a brick outer wythe.

It is still yet another object of the present invention to provide a metal foil masonry flashing system which operates cooperatively with present flashing accessories such as mortar guards and weep hole fittings.

It is a feature of the present invention that the hot melt adhesive hereof is compatible with flashing membranes containing ketone ethylene ester and meets industry flammability standards.

It is another feature of the present invention that the polymeric membrane hereof is highly, ultra-violet resistant and the membrane includes an embedded woven or non-woven fiber layer to enhance tear and puncture resistance.

It is yet another feature of the present invention that the termination bar has a foam layer thereon for sealing upon installation and obviate the use of sealants and caulks during the installation of the flashing system.

Other objects and features of the present invention will become apparent upon reviewing the drawing and reading the detailed description which follows.

BRIEF DESCRIPTION OF THE DRAWINGS

In the following drawings, the same parts in the various views are afforded the same reference designators.

DESCRIPTION OF THE PREFERRED EMBODIMENTS

Three embodiments of the metal-foil based masonry Flashings of this disclosure are shown herein. Two of the embodiments have an external pressure-activated hot melt adhesive layer which forms a flashing suitable for through-wall or surface-mounted installation. In all three embodiments, at least one face of the metal foil lamina is coated with a modified polymeric coating. In all cases the metal-foil base has both surfaces thereof coated with either a hot-melt adhesive or a modified polymeric coating.

For the purpose of the description which follows, the term modified polymeric coating is defined as a coating prepared from a mixture of selected polymers, antioxidants, resins, and modifiers and applied to a substrate by roll or dip coating. At room temperature, such materials are typically solid, but flexible. The modified polymeric coatings are frequently applied at temperatures between 350° and 450° F. and have a short cure cycle.

In the metal foil/scrim masonry flashing system disclosed herein, in contradistinction to the parent case, hot melt adhesives are used to attach flashing material with modified polymeric coating on at least one side of the metal foil to the cavity face of the masonry inner wythe. The masonry flashing is emplaced behind the insulation which, in turn, serves to protect against thermal losses, to reduce sound, and to prevent water vapor condensing on colder surfaces. The metal foil increases the longevity of the flashing by enhancing the tensile strength and by improving tear and puncture resistance.

Figure 1:
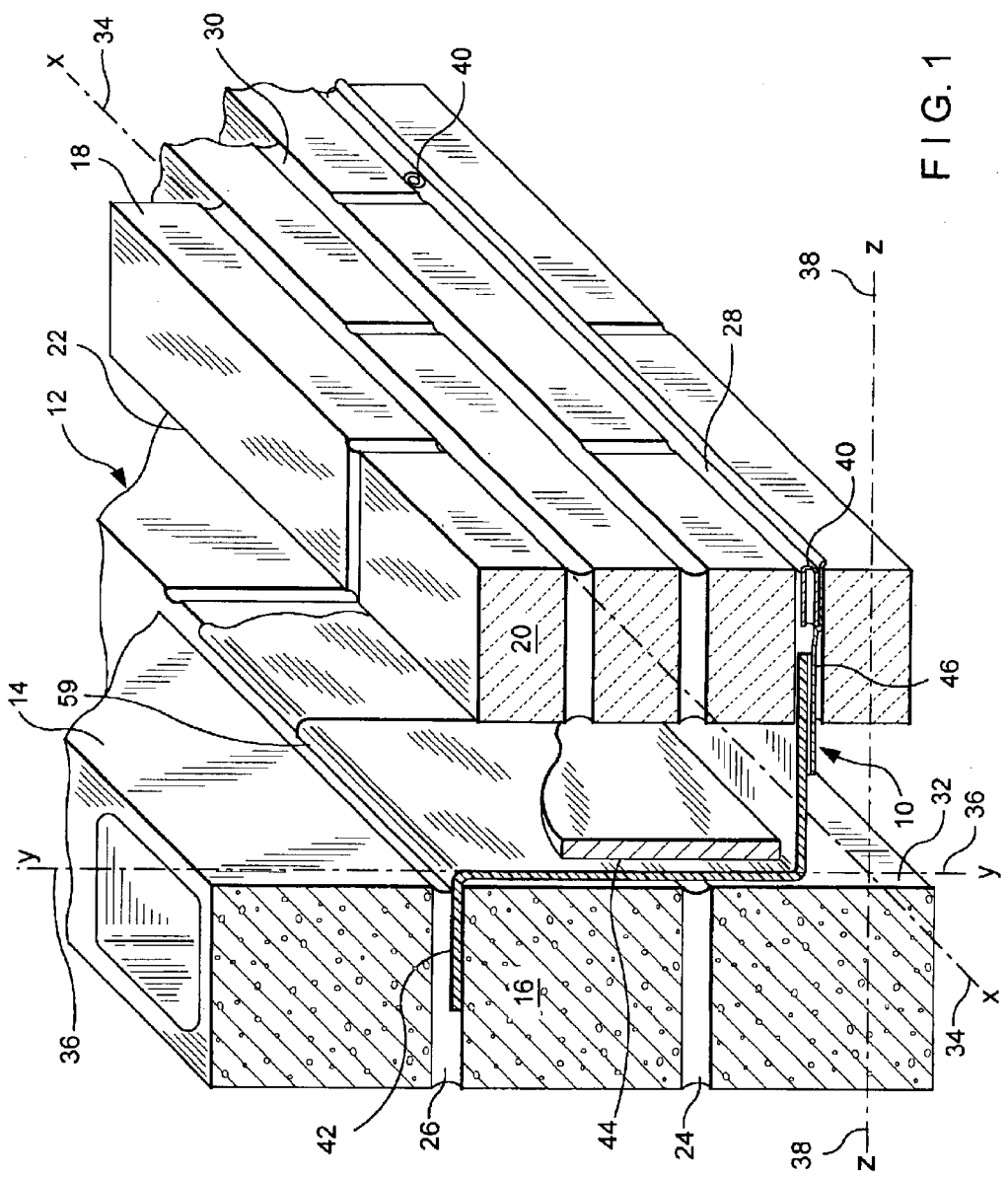
FIG. 1 is a perspective view of a first embodiment of a metal foil masonry flashing system of this invention and shows a cavity wall with an interior wythe of masonry block and an exterior wythe of brick having a through-wall-mounted flashing membrane installed in the cavity thereof.
Figure 2:
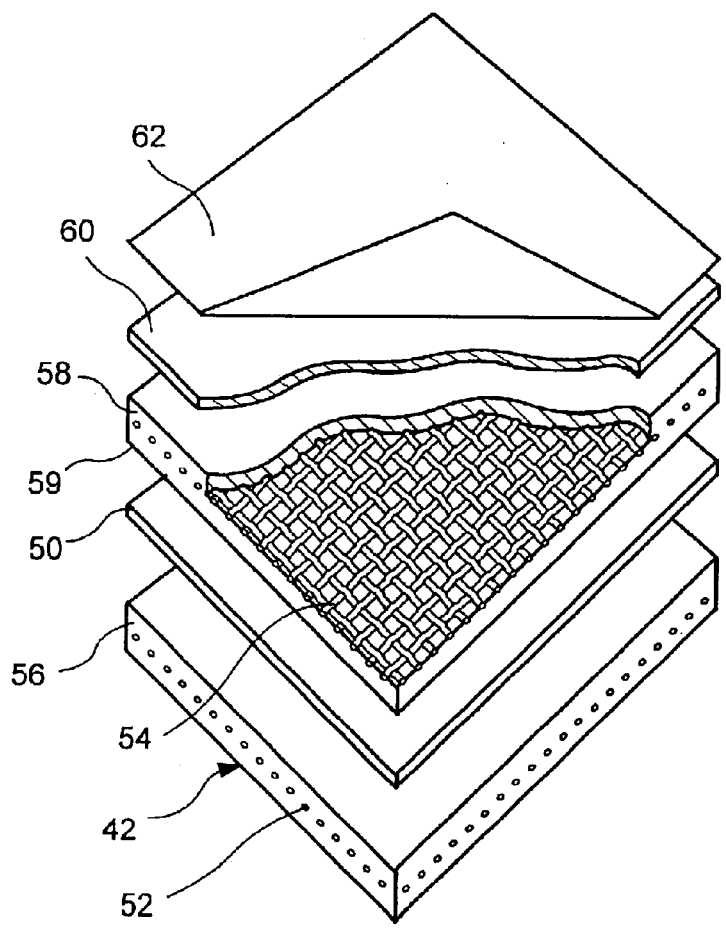
FIG. 2 is a perspective view of the uninstalled peel-and-stick flashing membrane of FIG. 1 with successive laminae partially broken away to show details of the structure thereof.
Figure 3:
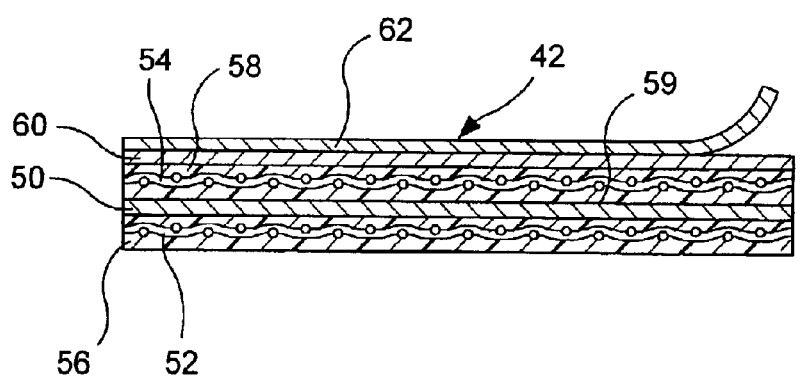
FIG. 3 is a cross-sectional view of the flashing membrane of FIG. 2.

Referring now to FIGS. 1 through 3, the first embodiment of this invention in which a masonry flashing system, referred to generally by the reference designator 10, is shown. In this embodiment, a cavity wall structure 12 is shown having an inner wythe 14 of masonry blocks 16 and an outer wythe 18 of facing brick 20. Between the inner wythe 14 and the outer wythe 18, a cavity 22 is formed. Successive bed joints 24 and 26 are formed between courses of blocks 16 and the joints are substantially planar and horizontally disposed. Also, successive bed joints 28 and 30 are formed between courses of bricks 20 and the joints are substantially planar and horizontally disposed. For the through-wall flashing installation of this embodiment bed joint 26 and bed joint 28 are employed.

For purposes of this discussion, the exterior surface 32 of the interior wythe 14 contains a horizontal line or x-axis 34 and an intersecting vertical line or y-axis 36. A horizontal line or z-axis 38 also passes through the coordinate origin formed by the intersecting x- and y-axes. In the discussion which follows, it will be seen that the masonry flashing system 10 of this invention is constructed to completely seal the cavity, to drain water therefrom and to permit air and water vapor to enter and exit through weep holes 40 that are in communication the masonry flashing system 10.

Across the cavity 22, in this embodiment, a through-wall installation of the masonry flashing system is shown. The system 10 includes a composite flashing membrane 42 having a metal foil core with layers of modified polymeric coating and hot melt adhesive thereon. The flashing membrane 42 is constructed for embedment in bed joint 26 in an x-z plane, for adherence to surface 32 in an x-y plane, for extending and slanting downwardly across and into bed joint 28 thereby sealing cavity 22. The masonry flashing 10 is embedded in bed joint 28 in an x-z plane. In this preferred mode, it is seen that the metal foil/scrim flashing 42 is installed behind insulation 44.

Between the membrane 42 and the brick 20, a drip plate 46, preferably of stainless steel, is constructed to improve the communication between the masonry flashing system 10 and weep holes 40. Weep holes 40 permit any moisture or condensate to drain away from and out of the cavity 22.

Referring now to FIGS. 2 and 3 the laminar structure of the uninstalled peel-and-stick flashing membrane 42 is shown. The membrane 42, while being shown in FIG. 1 as a through-wall mounted system, is suitable for either through-wall or surface mounting and utilizes the hot melt adhesive technology for both construction and application. The laminar structure consists of a seven-layer arrangement. When viewing the uninstalled membrane 42 from the exposed surface and proceeding toward the mounted surface these layers are:

a. modified polymeric coating Q'SO Q-100BB;
b. scrim;
c. metal foil—copper;
d. scrim;
e. modified polymeric coating Q'SO Q-100BB;
f. hot melt adhesive Q'SO Q-18-40 or APC #915; and
g. release sheet.

The metal-foil or copper base 50 is covered on each side with a layer of fibrous reinforcing webs or scrims 52 and 54. The scrims 52 and 54 are, in turn, embedded in modified polymeric coatings 56 and 58 respectively, which layers are adhered to the metal foil base 50. The combined copper base 50, scrims 52 and 54, and embedment coatings 56 and 58 is further referred to hereinbelow as copper flashing 59. The hot melt adhesive layer 60 is applied atop modified polymeric coating 58, which adhesive layer is pressure activatable and has a release sheet 62 thereover. Upon installation, the release sheet 62 is removed and discarded. Each layer is described in further detail below.

Although almost any metal foil can be used as a substrate for the masonry flashing hereof, the industry has traditionally used copper and more recently, especially with all metal Flashings, stainless steel and aluminum. Other utilizable metal foils include those of lead-coated copper, galvanized steel, and terne-coated and epoxy-coated metal foils. The metal foil lamina enhances the tensile strength and puncture- and tear-resistant characteristics of the flashing. As with copper and bitumen flashing combinations any of the commonly used weights of copper sheeting may be used, including, but not limited to, 2 oz/sq. ft., 3 oz/sq. ft., 5 oz/sq. ft. and 7 oz/sq. ft. In this embodiment the copper sheet 50 weighs 5 oz/sq. ft. (approx.).

The fibrous reinforcing webs or scrims 52 and 54 in the best mode of practicing this invention are woven fiberglass scrims Style 1658/001 manufactured by CCX, Inc., Walterboro, S.C. 29488 or equivalent. These scrims are 20×10 count/inch plain weave in the weight range of 1.60 to 2.00 oz/sq. yd. The scrims 52 and 54 are structurally sufficiently open to permit a coating applied to the exterior thereof to flow through the weave and adhere to the metal foil lamina. By such processing the scrims become embedded within the coating material. Besides the specific fiberglass scrim recited above, a nonwoven technical textile, such as the reinforcing composite of Woiceshyn et al., U.S. Pat. No. 4,762,744 for bituminous roofing membrane, is applicable (see supra). Other utilizable textiles include glass fiber material, gauzes, and practically any open weave fabric meeting the reinforcement criteria and the embedability parameter.

Referring to FIGS. 2 and 3, the peel-and-stick polymeric membrane 42 further includes modified polymeric coatings 56 and 58, specifically Q-100BB Coating Compound from Q'SO, Inc., Saginaw, Tex. 76179 or equivalent. These coatings are applied by a roll coating process in which a mixture of various polymers, antioxidants, resins and modifiers are heated to free-flowing state at 375° F. (approx.) and cured upon cooling to a solid, but flexible, coating. While the roll coating process has been employed herein other coating processes including dip coating and electrostatic spray coating are applicable. It is further noted that the modified polymeric coating is disposed on the fibrous reinforcing web and in the free-flowing state flows through the interstices in the web and bonds to the metal foil lamina. Sufficient coating material is supplied so that the web is embedded in the coating.

Referring again to FIGS. 2 and 3, the peel-and-stick metal foil/scrim membrane 42 further includes a hot melt adhesive layer 60 which is formulated for pressure activation and compatibility with the modified polymeric coatings 56 and 58. To complete the laminar flashing structure, a release sheet 62 is adhered atop the hot melt adhesive layer 60. The adhesives described herein are particularly useful for peel-and-stick applications in building construction industry as such adhesives are readily pressure activated after the release paper is removed.

The adhesive is formulated so that, in case of fire, the coatings thereof will not contribute to smoke or accelerate flame spreading and thus do not require inorganic fillers which are known to interfere with the adhesive function. Also, the adhesives are formulated to have sufficient tackiness so that a durable bond between the membrane and the rough and porous surface of the masonry block is experienced. The adhesive on the through-wall flashing permits lapping of the widths of flashing precluding the need for caulks and sealants at the lapped joints.

Incorporating by reference the Di Rado et al. patent, U.S. Pat. No. 5,106,447, the hot melt adhesive compositions of hot melt layer 60 may be prepared from 10 to 50 weight percent of an isotactic thermoplastic polybutene-l/ethylene copolymer containing from about 5.5 to about 10% by weight ethylene (polybutylene); 20 to 50 percent of a tackifier; 15 to 50 percent of an amorphous diluent having a softening point greater than 90 degrees C.; 0 to 2 percent of a stabilizer; and 0 to 5 percent wax.

The tackifying resins which may be used to extend the adhesive properties of the isotactic polybutylene include: (1) hydrogenated wood rosin or rosin ester; (2) polyterpene resins having a softening point, as determined by an ASTM method E28-58 T, of from about 80 degrees C. to 150 degrees C.; (3) aliphatic petroleum hydrocarbon resins having a Ball and Ring softening point of from about 80 degrees C. to 160 degrees C., resulting from polymerization of monomers consisting primarily of 5 carbon atom olefins and diolefins, and including the latter resins which are aromatically modified; and, (4) partially and fully hydrogenated hydrocarbon resins.

The amorphous diluents which are needed and present in the adhesive composition include (atactic) amorphous polypropylene or other similar high softening point (i.e. greater than 90 degrees C.), low crystalline diluent, (e.g. amorphous polyalpha-olefins). These diluents, are used at levels of 20 to 50% by weight, preferably about 20 to 25% by weight.

Examples of suitable commercially available polyterpene resins of this type are the Nirez resins sold by Reichhold Chemical, the Zonatac resins sold by Arizona, and the Piccolyte S-10, S-25, S-40, S-85, S-100, S-115, S-125 and S-135 resins as sold by Hercules Chemical. Further, the examples of the above aliphatic petroleum hydrocarbon resins are Wingtack 95 and Wingtack Extra as sold by the Goodyear Tire and Rubber Company and the Escorez 1000 series of resins sold by the Exxon Chemical Corporation; and of the partially and fully hydrogenated hydrocarbon are resins such as Resin H-130 from Eastman, Escorez 5000 series from Exxon, and Regalrez from Hercules.

To test the degree of tackiness of the above-described flashing structure, a pull test is performed. An 8-inch by 12-inch sample of flashing 59 is coated with a hot melt adhesive, namely, Q-18-40, manufactured by Q'SO, Inc., Saginaw, Tex. 76179 or equivalent, which hot melt adhesive formulation includes one or more of the aforementioned tackifying resins. A suitable release paper is applied thereover. After a prescribed cure period, the release paper is removed and the flashing of this invention is applied to the surface of a concrete block. The application to the concrete block is at room temperature utilizing a hand-operated laminating roller to provide the pressure activation. A spring scale is then attached to the masonry flashing and a 65 lb. force is required to peel the flashing from the block.

Figure 4:
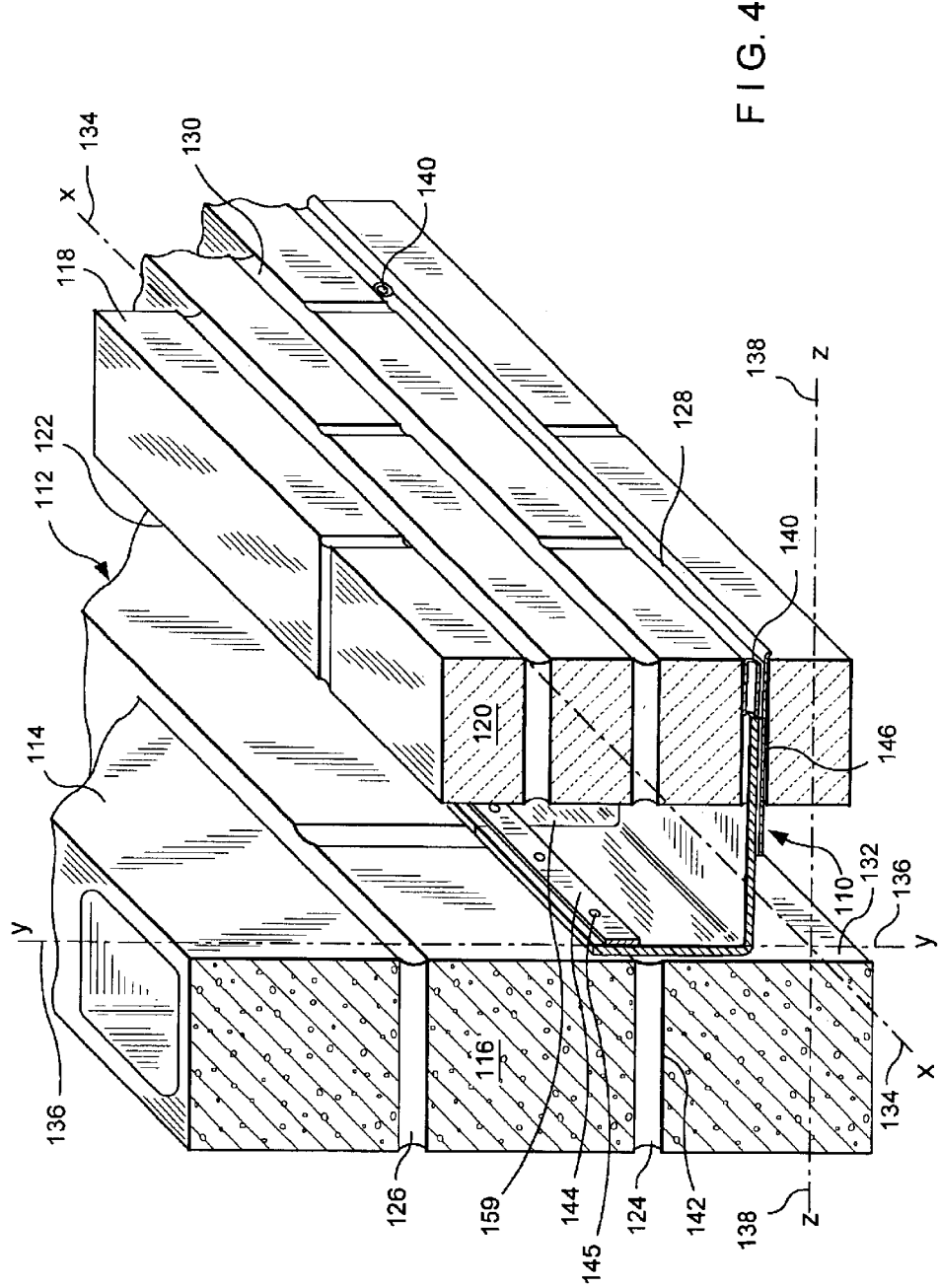
FIG. 4 is a perspective view of a second embodiment of a metal foil masonry flashing system of this invention and shows a cavity wall with an interior wythe of masonry block and an exterior wythe of brick having a surface-mounted flashing membrane installed in the cavity thereof.
Figure 5:
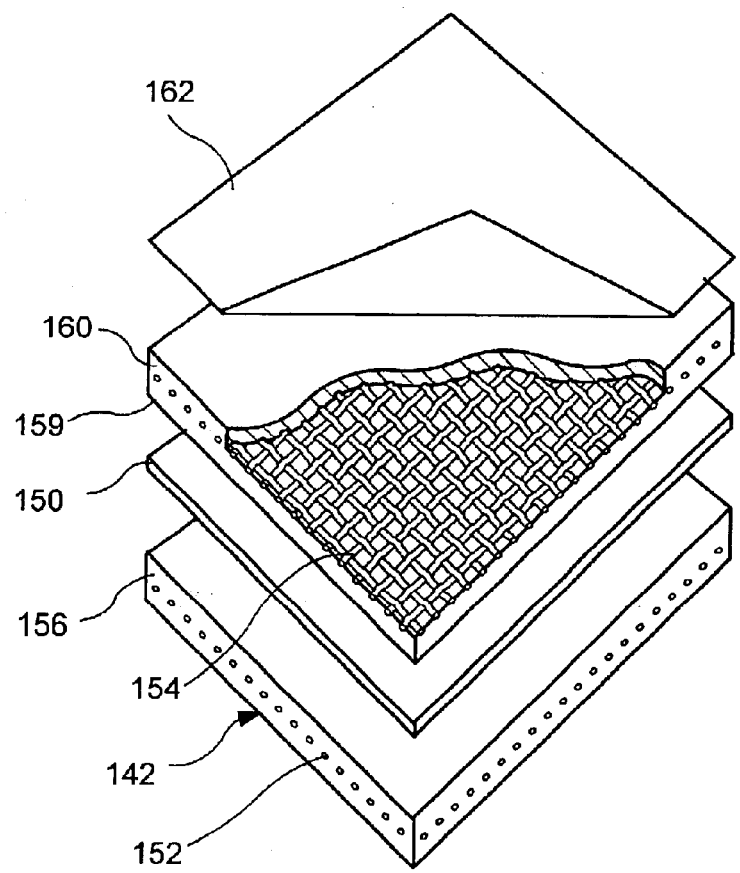
FIG. 5 is a perspective view of the uninstalled peel-and-stick flashing membrane of FIG. 4, similar to FIG. 2 but having a single layer of modified polymeric coating.
Figure 6:
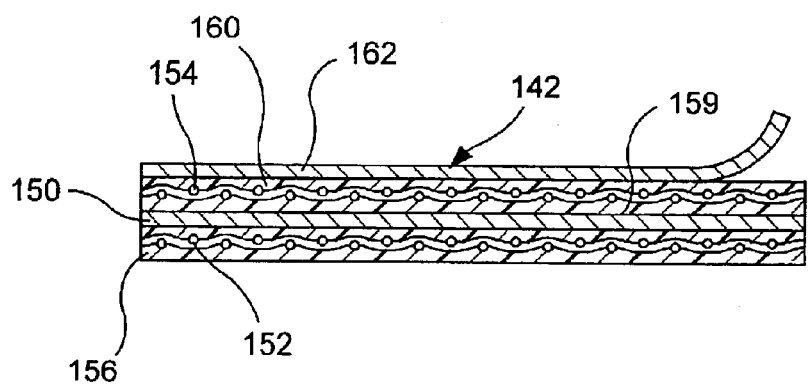
FIG. 6 is a cross-sectional view of the flashing membrane of FIG. 5.

Referring now to FIGS. 4 through 6, the second embodiment of this invention in which a surface-mounted metal foil/scrim flashing system, referred to generally by the reference designator 110, is shown. In this embodiment, similar parts to those of the first embodiment are referred to by reference designators 100 units higher than a similar part in the first embodiment. Thus, for example, the masonry block 16 in the first embodiment has an analogous masonry block 116 in the second embodiment. Here a cavity wall structure 112 is shown having an inner wythe 114 of masonry blocks 116 and an outer wythe 118 of facing brick 120.

Between the inner wythe 114 and the outer wythe 118, a cavity 122 is formed. Successive bed joints 124 and 126 are formed between courses of blocks 116 and the joints are substantially planar and horizontally disposed. Also, successive bed joints 128 and 130 are formed between courses of bricks 120 and the joints are substantially planar and horizontally disposed.

For purposes of this discussion, the exterior surface 132 of the interior wythe 114 contains a horizontal line or x-axis 134 and an intersecting vertical line or y-axis 136. A horizontal line or z-axis 138 also passes through the coordinate origin formed by the intersecting x- and y-axes. In the discussion which follows, it will be seen that the metal foil/scrim flashing system 110 is constructed to completely seal the cavity and to drain water and water vapor therefrom through weep holes 140 that are in communication the flashing system 110.

Across the cavity of 122, in this embodiment, a surface-mounted installation of the metal foil/scrim flashing system 110 is shown. The system 110 includes a metal foil/scrim flashing membrane or a composite sheet 142 constructed for adherence to surface 132 in an x-y plane, for extending across and canted slightly downwardly from an x-z plane into bed joint 128 sealing cavity 122, and for embedment in bed joint 128 where the membrane thereby is adhered to drip plate 146. In this preferred mode, it is seen that the membrane 142 is installed behind termination bar 144 secured by attaching hardware 145.

Between the membrane 142 and the brick 120, a drip plate 146, preferably of stainless steel, is constructed to improve the communication between the masonry flashing system 110 and weep holes 140.

Referring now to FIGS. 5 and 6 the laminar structure of the peel-and-stick flashing membrane 142 is shown in greater detail. The membrane 142 is suitable for surface mounting and utilizes the hot melt adhesive technology for both construction and application. The laminar structure consists of a five-layer arrangement and a release sheet. When viewing the uninstalled membrane 142 from the exposed surface and proceeding toward the mounted surface these layers are:

a. modified polymeric coating Q'SO Q-100BB
b. scrim
c. metal foil—stainless steel—304SS
d. scrim
e. hot melt adhesive—APC #915
f. release sheet The modified polymeric coating, the scrim, and the hot melt adhesive have been described in detail above.

The metal-foil or stainless steel base 150 has two major surfaces and each is covered with a layer of fibrous reinforcing web or scrim 152 and 154, respectively. The scrim 152 is embedded in a modified polymeric coating 156 which is applied by a roll coating process and is adhered to the metal foil base 150. The scrim 154 is embedded in a layer of hot melt adhesive 160, which is adhered to the metal foil base 150. The combined stainless steel base 150, scrims 152 and 154, and embedment coatings 156 and 158 is further referred to hereinbelow as stainless steel flashing 159. The hot melt adhesive layer 160 is applied atop the stainless steel base 150, which adhesive layer is pressure activatable and has a release sheet 162 thereover. Upon installation, the release sheet 162 is removed and discarded.

Referring again to FIGS. 5 and 6, a metal foil or stainless steel layer is shown. The metallic layer is provided to enhance the tensile strength and the puncture- and tear-resistant characteristics of the flashing membrane. As in the first embodiment, the metal foil thickness is determined by desired pliability and strength. Here, the preferred material is from the 300-series stainless steels, usually 304SS, and may be 22 ga. to 32 ga. thick (in the example 24 ga. material).

Referring again to FIGS. 5 and 6, the peel-and-stick metal foil/scrim flashing membrane 142 further, as described, includes a hot melt adhesive layer 160 which is formulated for pressure activation and compatibility with the metal foil 150, and the release sheet 162 adhered thereto. Because of the tackiness of the adhesives, the adhesive described herein is particularly useful for peel-and-stick applications in building construction industry. In this application, after the release paper is removed, such adhesives are readily pressure activated.

As in the first embodiment, the adhesive is formulated so that, in case of fire, the coatings thereof will not contribute to smoke or accelerate flame spreading and thus do not require inorganic fillers which are known to interfere with the adhesive function. Also, the adhesives are formulated to have sufficient tackiness so that a durable bond between the membrane and the rough and porous surface of the masonry block is experienced. Upon application to the backup wall, the adhesive on the surface-mounted flashing permits lapping of widths of the flashing obviating the use of caulks and sealants at the lapped joints.

Figure 7:
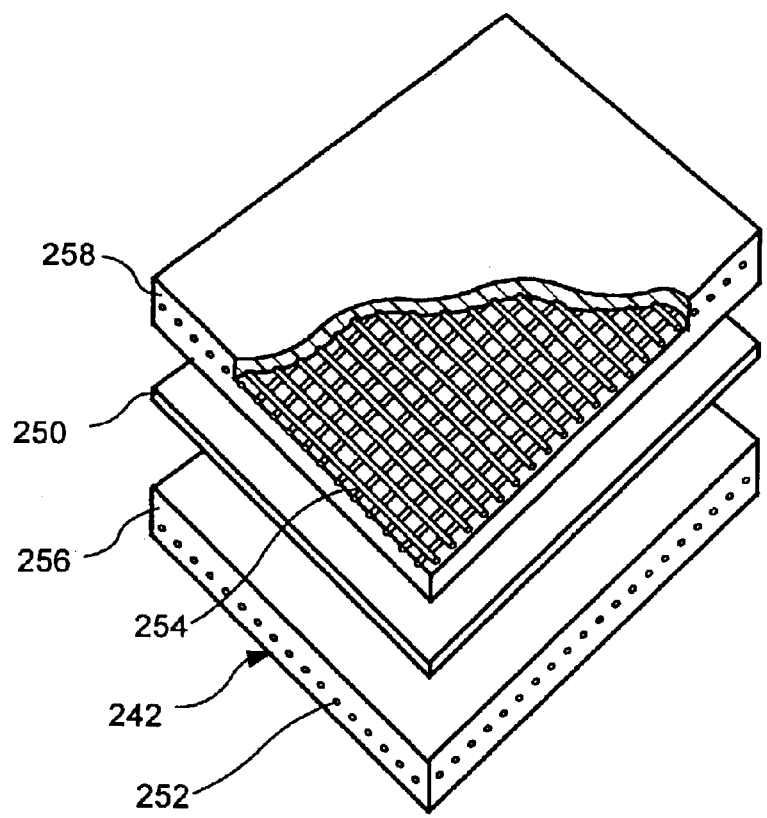
FIG. 7 is a perspective view of a third embodiment of a metal foil flashing of this invention and is an uninstalled flashing membrane suitable for through-wall mounting similar to FIG. 2 but without the hot melt adhesive layer and release sheet therof; and, FIG. 8 is a cross-sectional view of the flashing membrane of FIG. 7.
Figure 8:
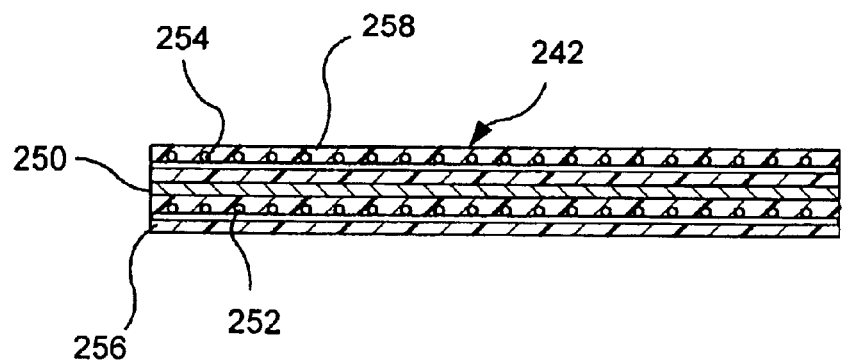

Referring now to FIGS. 7 and 8, the third embodiment of this invention in which an uninstalled metal foil/scrim flashing referred to generally by the reference designator 242, is shown. In this embodiment, a cavity wall structure identical to that in the second embodiment is employed. Here, only the uninstalled metal foil/scrim flashing 242, an alternative to that in FIGS. 2 and 3, is shown and parts similar to those in the first embodiment are referred to by reference designators 200 units higher than a similar part in the second embodiment. Thus, for example, the scrim 52 has an analogous scrim 252 in the third embodiment.

Referring now to FIGS. 7 and 8 the laminar structure of the metal foil/scrim flashing or membrane 242 is shown. The membrane 242, while being shown in FIGS. 7 and 8 is suitable for through-wall mounting only and is similar to the first embodiment but without the hot melt layer and the release sheet. The laminar structure consists of a five-layer arrangement. When viewing the uninstalled membrane 242 from the exposed surface and proceeding toward the mounted surface these layers are:

a. modified polymeric coating Q-S0 Q-100BB
b. scrim
c. metal foil-copper
d. scrim
e. modified polymeric coating The modified polymeric coating is a mixture of various polymers, antioxidants, resins, and modifiers similar to that of the first embodiment, see paragraph 52, above, but is suitable for dip coating equipment.

Referring now to FIGS. 7 and 8 the metal foil/scrim membrane 242 of this embodiment is shown in greater detail. The membrane 242 is comprised of copper sheet 250 which is reinforced by the disposition thereon of nonwoven scrims 252 and 254. The scrims 252 and 254 are embedded by dip coating in a modified polymeric coating and forming embedment layers 256 and 258, respectively, adhered to the major surfaces of copper sheet 250. The filamentous material 252 and 254 is constructed to permit the penetration of the coating and to enhance the tear and puncture resistance of the overall composite.

As the metal foil/scrim flashing of the third embodiment is not precoated with pressure activated adhesives, the mounting is accomplished utilizing termination bars, described in the patent applications related hereto. The joints, either butt or lap, are sealed in the field with sealing tape or standard mystics.

Because of environmental and flammability concerns with traditional solvent-based adhesives and an invested position in bitumen-containing materials, the building construction industry has been slow to adopt hot melt adhesive compositions for masonry flashing applications. Now, with the recent advances in hot melt adhesives technology incorporated into the above application advantages over solvent-based or bitumen systems are created hereby. Thus, because the metal/foil scrim membranes described above have the requisite tear and puncture resistance and the hot melt adhesives meet the fire retardancy and adhesiveness requirements, the previous barriers to use have been removed. It is further appreciated that the advance in the art is remarkable as the hot melt adhesives hereof do not contain organic solvents and thereby do not cause the environmental concerns of the solvent-based systems.

The metal foil/scrim flashing system of this invention exhibits temperature stability superior to that of bitumen materials and do not break down at high ambient temperatures. In addition, as hot melt adhesives are pressure activated, they set up immediately and reduce the time required for installation. Thus, the bonding of hot melt adhesives to masonry surfaces is immediate and unlike bitumen materials are not dependent on ambient temperatures for cure purposes. This translates into greater quality construction and easier assurance thereof. Another advantage of hot melt adhesives is their economy and applicability to peel-and-stick structures.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A masonry flashing for use in a cavity of a cavity wall, said cavity wall having an inner wythe of masonry block or other backup wall materials and an outer wythe with weep holes therethrough, said laminated flashing comprising, in combination:

a metal foil lamina having two major surfaces;

a pair of fibrous reinforcing webs each disposed on and coextensive with one major surface of said metal foil lamina;

a first embedment layer on and about one of said pair of fibrous reinforcing webs and adhered to and coextensive with said metal foil lamina ; and, a second embedment layer on and about the other of said pair of fibrous reinforcing webs and adhered to and coextensive with said metal foil lamina.

2. A masonry flashing as described in claim 1 wherein said pair of fibrous reinforcing webs is selected from a group consisting of a woven technical textile, a nonwoven technical textile, an open weave fabric, a glass fiber material, a gauze, and a scrim.

3. A masonry flashing as described in claim 2 wherein said metal foil lamina is constructed of material selected from a group consisting of copper, aluminum, stainless steel, lead-coated copper, galvanized steel, and terne-coated and epoxy-coated metal foils.

4. A masonry flashing as described in claim 3 wherein said first embedment coating and said second embedment coating are modified polymeric coatings applied in a molten state and curing to a solid coating.

5. A masonry flashing as described in claim 4 further comprising:

a hot melt adhesive layer disposed on and coextensive with one of said embedment layers of said modified polymeric coatings, said hot melt adhesive having sufficient tack to, upon pressure activation, durably adhere said masonry flashing to a masonry block surface; and, a release sheet disposed on and adhered to said second hot melt adhesive layer, said release sheet being removable prior to mounting said masonry flashing on said masonry block of said inner wythe;

whereby, upon surface mounting or through-wall installation, said masonry flashing delivers water accumulation of said cavity to said weep holes.

6. A masonry flashing as described in claim 5 wherein said hot melt adhesive comprises about 10 to 50 percent by weight of an isotactic thermoplastic, about 5.5 to 10 percent by weight of ethylene, about 20 to 50 percent of a tackifier resin; 15 to 50 percent by weight of an amorphous diluent; 0 to 2 percent by weight of a stabilizer; and 0 to 5 percent by weight of wax.

7. A masonry flashing as described in claim 5 wherein said masonry flashing is an elongated strip with two substantially parallel ends, and, upon installation, said strips overlap one over the other forming a sealed seam without requiring additional caulks and sealants.

8. A masonry flashing as described in claim 3 wherein:

said first embedment coating is a modified polymeric coating applied in a molten state and curing to a solid coating;

said second embedment coating is a hot melt adhesive with sufficient tack to, upon pressure activation, durably adhere said masonry flashing to the surface of said masonry block; and, a release sheet disposed on and adhered to said second hot melt adhesive layer, said release sheet being removable prior to mounting said masonry flashing on said inner wythe;

whereby, upon surface mounting or through-wall installation, said masonry flashing delivers water accumulation of said cavity to said weep holes.

9. A masonry flashing as described in claim 8 wherein said hot melt adhesive comprises about 10 to 50 percent by weight of an isotactic thermoplastic, about 5.5 to 10 percent by weight of ethylene, about 20 to 50 percent of a tackifier resin; 15 to 50 percent by weight of an amorphous diluent; 0 to 2 percent by weight of a stabilizer; and 0 to 5 percent by weight of wax.

10. A masonry flashing as described in claim 8 wherein said masonry flashing is an elongated strip with two substantially parallel ends, and, upon installation, said strips overlap one over the other forming a sealed seam without requiring additional caulks and sealants.

11. A masonry flashing for use in a cavity of a cavity wall, said cavity wall with an inner wythe formed from successive courses of masonry block having a bed joint between adjacent courses and an outer wythe with weep holes therethrough, said masonry flashing comprising, in combination:

a copper sheet having two major surfaces;

a pair of scrims each disposed on and coextensive with one of said major surfaces of said copper sheet;

a first embedment layer on and about one of said pair of scrims and adhered to and coextensive with said copper sheet; and, a second embedment layer on and about the other of said pair of scrims and adhered to and coextensive with said copper sheet.

12. A masonry flashing as described in claim 11 wherein said first embedment coating and said second embedment coating are modified polymeric coatings applied in a molten state and curing to a solid coating.

13. A masonry flashing as described in claim 12 further comprising:

a hot melt adhesive layer disposed on and coextensive with one of said embedment layers of said modified polymeric coatings, said hot melt adhesive having sufficient tack to, upon pressure activation, durably adhere said masonry flashing to the surface of said masonry block; and, a release sheet disposed on and adhered to said second hot melt adhesive layer, said release sheet being removable prior to mounting said masonry flashing on said inner wythe;

whereby, upon surface mounting or through-wall installation, said masonry flashing delivers water accumulation of said cavity to said weep holes.

14. A masonry flashing as described in claim 11 wherein:

said first embedment coating is a modified polymeric coating applied in a molten state and curing to a solid coating;

said second embedment coating is a hot melt adhesive with sufficient tack to, upon pressure activation, durably adhere said masonry flashing to the surface of said masonry block; and, a release sheet disposed on and adhered to said hot melt adhesive layer, said release sheet being removable prior to mounting said masonry flashing on said masonry block;

whereby, upon surface mounting or through-wall installation, said masonry flashing delivers water accumulation of said cavity to said weep holes.

15. A masonry flashing as described in claim 11 wherein said copper sheeting has a weight per square foot in the range of 2 oz/ft$^2$ to 7 oz/ft$^2$.

16. A masonry flashing for use in a cavity of a cavity wall, said cavity wall with an inner wythe formed from successive courses of masonry block having a bed joint between adjacent courses and an outer wythe with weep holes therethrough, said masonry flashing comprising, in combination:

a stainless steel sheet having two major surfaces;

a pair of scrims each disposed on and coextensive with one of said major surfaces of said stainless steel sheet;

a first embedment layer on and about one of said pair of scrims and adhered to and coextensive with said stainless steel sheet; and, a second embedment layer on and about the other of said pair of scrims and adhered to and coextensive with said stainless steel sheet.

17. A masonry flashing as described in claim 16 wherein said first embedment coating and said second embedment coating are modified polymeric coatings applied in a molten state and curing to a solid coating.

18. A masonry flashing as described in claim 17 wherein:said first embedment coating is a modified polymeric coating applied in a molten state and curing to a solid coating;

said second embedment coating is a hot melt adhesive with sufficient tack to, upon pressure activation, durably adhere said masonry flashing to the surface of said masonry block; and, a release sheet disposed on and adhered to said hot melt adhesive layer, said release sheet being removable prior to mounting said masonry flashing on said masonry block;

whereby, upon surface mounting or through-wall installation, said masonry flashing delivers water accumulation of said cavity to said weep holes.

19. A masonry flashing as described in claim 16 wherein:

said first embedment coating is a modified polymeric coating applied in a molten state and curing to a solid coating;

said second embedment coating is a hot melt adhesive with sufficient tack to, upon pressure activation, durably adhere said masonry flashing to the surface of said masonry block; and, a release sheet disposed on and adhered to said second hot melt adhesive layer, said release sheet being removable prior to mounting said masonry flashing on said masonry block of said inner wythe;

whereby, upon surface mounting or through-wall installation, said masonry flashing delivers water accumulation of said cavity to said weep holes.

20. A masonry flashing as described in claim 16 wherein said inless steel sheet is type 304SS with a gauge in the range of 22ga. to 32 ga.

* * * * *